United States Patent [19]

Evans

[11] 4,122,247

[45] Oct. 24, 1978

[54] PROCESS FOR THE POLYMERIZATION OF CYCLIC DIORGANOPOLYSILOXANES WITH CATION-COMPLEX CATALYSTS

[75] Inventor: Edwin Robert Evans, Clifton Park, N.Y.

[73] Assignee: General Electric Company, Waterford, N.Y.

[21] Appl. No.: 808,930

[22] Filed: Jun. 22, 1977

Related U.S. Application Data

[63] Continuation-in-part of Ser. No. 716,623, Aug. 23, 1976, abandoned.

[51] Int. Cl.$^2$ .............................................. C08G 77/04
[52] U.S. Cl. ................................ 528/14; 260/448.2 E; 260/615 B; 252/431 R; 528/18; 528/37; 528/421
[58] Field of Search .................... 260/46.5 R, 448.2 E

[56] References Cited

U.S. PATENT DOCUMENTS 4,003,917  1/1977  Selin .............................. 260/448.2 E Primary Examiner—Melvyn I. Marquis
Attorney, Agent, or Firm—E. Philip Koltos; John L. Young; Frank L. Neuhauser

[57] ABSTRACT

Diorganopolysiloxane homo- and copolymers having a viscosity from 50 to 200,000,000 centipoise at 25° C, are produced by (a) reacting a composition of (i) a first cyclic siloxane having 3 to 6 units alone or admixed with (ii) a second cyclic siloxane having 3 to 6 units, (i) being present in an amount of 30 to 100 mol % of the composition, at a temperature in the range of 90° to 150° C and in the presence of 5 to 500 parts per million, as alkali metal hydroxide of a catalyst comprising alkali metal hydroxide or a silanolate of an alkali metal hydroxide complexed with a low molecular weight polymer of ethylene oxide (polyethylene glycol) soluble in the cyclic siloxanes. Especially useful products of the process are homopolymers and copolymers including siloxane chain units of the formula R R$^1$ SiO wherein R$^1$ is alkyl, halogenated alkyl or cycloalkyl, and preferably, perfluoroalkyl, and R is the same as R$^1$ and, in addition, vinyl or phenyl.

15 Claims, No Drawings

PROCESS FOR THE POLYMERIZATION OF CYCLIC DIORGANOPOLYSILOXANES WITH CATION-COMPLEX CATALYSTS

FIELD OF THE INVENTION

The present application is a continuation-in-part of parent patent application Ser. No. 716,623, filed Aug. 23, 1976, now abandoned.

The present invention relates to a process for producing diorganopolysiloxane homo- and copolymers from mixtures of cyclic siloxanes and, more specifically, to the production of such homo- and copolymers from mixtures of cyclic siloxanes using a novel cation-complex catalyst comprising an alkali metal hydroxide complexed with a low molecular weight polymer of ethylene oxide soluble in the cyclic siloxanes.

BACKGROUND OF THE INVENTION

It is well known that siloxane homo- and copolymers can be prepared to provide an advantageous balance of properties and economics. Moreover, in comparison with mixtures of homopolymers, copolymers are generally more effective in producing any desired property, and the tendency to separate on a microscopic scale is avoided. Homopolymers can be made by polymerizing the cyclic siloxanes, subject to the difficulties mentioned hereinafter, if one of the silicon-bonded substituents comprises an aliphatic radical or haloaliphatic radical of 3 carbon atoms or greater. Copolymers of diorganopolysiloxanes can also be prepared by mixing and polymerizing the respective cyclic siloxanes, but, again, if one of the siloxanes has a silicon-bonded aliphatic or haloaliphatic radical of three carbon atoms or greater, then only up to 20 mol % of the other co-monomer, which does not include such a structural limitation, can be incorporated. Johannson, U.S. Pat. No. 3,002,951, illustrates the problem and the limitation. Johannson discloses that if a cyclic trisiloxane, having 3 or more carbon silicon-bonded organo substituents, is reacted in admixture with another cyclic diorganosiloxane compound, in the presence of a strong alkali catalyst, under non-equilibrating conditions, only up to 10 mol % of the co-monomer will polymerize. It is stated in Johannson that, if one starts with cyclic tetrasiloxanes and subjects them to the same alkaline polymerization conditions, no apparent polymerization occurs. At the other end of the composition range, Polmanteer et al, U.S. Pat. No. 3,050,492 discloses that only up to about 15 mol % of fluorosilicone can be copolymerized under equilibration conditions.

Surprisingly, now, it has been discovered that an alkali metal hydroxide, most preferably potassium or sodium hydroxide, alone, or as the silanolate, can be complexed with low molecular weight polymers of ethylene oxide soluble in the siloxanes and the complex is very efficient to catalyze homo- and copolymerization of a very wide variety of cyclics, including the difficult or previously thought to be impossible ones, into oils and gums of substantial commercial utility. Moreover, copolymerization of the cyclic tetramer with other cyclic co-monomers will occur over a wide variety of composition ranges, and is not limited to the 90 mol % maximum found under non-equilibrating conditions with the cyclic trimer as reported by Johannson, or the 15 mol % maximum found under equilibrating conditions by Polmanteer et al.

The process using the new catalysts of this invention has many important advantages. It permits the use of cyclic tetramers which are more readily obtained from hydrolyzate cracking than the trimers used by Johannson (although the latter can be used). Tetramers substituted with "difficult" substituents, readily homo- and copolymerize. The process can be employed with conventional chain-stoppers to provide homo- and copolymers with molecular weights varying over a wide range, to produce oils and gums. Polymerization is generally rapid. Conversion of the cyclic starting materials to the desired polymerized products are generally high.

Although, in copending application Ser. No. 574,333, now abandoned, it is disclosed that similar results can be obtained in the novel process disclosed therein, the present process unexpectedly gives equivalent results and has the additional advantages of eliminating any possible exposure of process operators to toxic catalyst materials and the need for process checks to verify the absence of residual cyclic ether in products which might be used in contact with food or in products which may be ingested or used in contact with the body. Since the present process employs a catalyst-complex containing readily available, easily manufactured and highly stable components, this process is particularly suitable for large scale commercial production.

The present invention is of prime importance in the use of methyl-3,3,3-trifluoropropylsiloxane cyclic tetramer as a starting material. Both Johannson, cited above, and Pierce et al, U.S. Pat. No. 2,979,519, disclose that such cyclic tetrasiloxanes cannot be homopolymerized. Moreover, the catalyst and conditions set forth herein permit the copolymerization of this fluorosilicone tetramer with dimethyl tetramer (or dimethyl trimer) in the range of 30 to 98 mol % fluorosilicone. The ability to produce such copolymers is an advance in the art since, if the full solvent resistance properties of the fluorosilicone were not needed, a blend of fluorosilicone polymer with methyl polymers would be necessary. However, a copolymer is more efficient in solvent resistance than a blend at the same fluorosilicone content. In addition, while stable blends of fluorosilicone and methyl polymers can be made for high viscosity gums, it is impossible to make stable blends of lower viscosity oils, such as would be used in room temperature vulcanizing and fluid products, because the incompatibility of the fluorosilicone oil with the methyl oil will cause separation of these two components. Thus, the best balance of economy and solvent resistance is achieved.

It is, accordingly, a principal object of the present invention to provide a process for producing diorganopolysiloxane homo- or copolymer gums or oils in high yield, using a cyclic monomer, and especially those wherein at least one of the organo groups attached to the silicon atom is aliphatic or haloaliphatic of at least three carbon atoms or more.

Another object of the present invention is to provide diorganopolysiloxane homo- and copolymer oils, fluids and gums, such oils, fluids and gums ranging in viscosity from 50 to 200,000,000 centipoise at 25° C., and particularly those wherein at least one of the organo groups attached to the silicon atoms in one of the co-monomers is aliphatic or haloaliphatic of 3 carbon atoms or more, by a novel process comprising equilibrating cyclic siloxanes, alone, or in admixture of cyclic co-monomers in the presence of certain ethylene oxide polymer cation-complex catalysts.

A further object of the present invention is to provide diorganopolysiloxane copolymer oils or gums having a viscosity from 50 to 200,000,000 centipoise at 25° C., wherein at least one of the co-monomers comprises 30 to 85 mol % of the copolymer units, and includes organo groups attached to the silicon atoms having at least 3 carbon atoms, and particularly, a —CH$_2$CH$_2$R$^7$ substituent group, where R$^7$ is perfluoroalkyl, using a cyclic tetrasiloxane as a co-monomer.

SUMMARY OF THE INVENTION

In accordance with the foregoing objects, the present invention provides a process for producing a diorganopolysiloxane oil or gum having a viscosity from 50 to 200,000,000 centipoise at 25° C. comprising (A) reacting a composition comprising (i) a cyclic polysiloxane of the formula, $$(R\ R^1\ SiO)_x$$

or a mixed such polysiloxane where R is methyl, ethyl, vinyl or phenyl and R$^1$ is as defined for R and in addition, an alkyl of 3 to 8 carbon atoms, halogenated alkyl of 3 to 8 carbon atoms, or cycloalkyl of 3 to 8 carbon atoms and x is from 3 to 6, and (ii) a cyclic polysiloxane of the formula, $$(R_2^2\ SiO)_y$$

wherein R is, independently methyl, ethyl, vinyl or phenyl and y is from 3 to 6, or a mixed such polysiloxane, (i) being present in an amount of from 30 to 100 mol % of the composition at a temperature in the range of 20° to 160° C. in the presence of 5 to 500 parts per million, as alkali metal hydroxide, of a catalyst comprising (a) alkali metal hydroxide complexed with a low molecular weight polymer of ethylene oxide, or (b) a silonate of alkali metal hydroxide complexed with a low molecular weight polymer of ethylene oxide, and (B) neutralizing the catalyst in the reaction mixture after equilibrium has been reached.

A preferred embodiment comprises neutralizing the catalyst with an inorganic acid, such as phosphoric acid, an organosilane of the formula R$_b^6$ SiX$_{4-b}$, wherein R$^6$ is alkyl, cycloalkyl, vinyl or phenyl and preferably, alkyl, cycloalkyl of 1 to 8 carbon atoms, and X is bromine or chlorine and b is from 0 to 3.

It is preferred to obtain the product homo- or copolymer in essentially pure form, after the equilibration and neutralization steps are complete by heating the mixture to 150° to 200° C. at a vacuum of 1 to 100 millimeters of mercury to strip off all volatiles. The equilibration reaction preferably will require from ½ hour to 20 hours and, more preferably, from 50 minutes to 12 hours. For maximum efficiency, it is preferred that the cyclic siloxanes composition to be homo- or copolymerized will have less than 20 parts per million of trifunctional silanes, less than 200 parts per million of monofunctional siloxanes, and less than 10 parts per million of water. The optional co-monomer (ii) can also be a cyclic trimer, tetramer, pentamer or hexamer. These are known in the art, see, for example, the Johannson patent cited above. Preferably, (i) and (ii) will be trimers or tetramers, and especially preferably, (i) will be a tetramer. In copolymerizations, the amount of co-monomer (i) in admixture with (ii) will vary between 30 and 98 mol %. Preferably, (i) will comprise from 30 to 85 mol % of (i) and (ii). Further, preferably, the R$^1$ substituent radical in the above formulae of the siloxanes is R$^7$CH$_2$CH$_2$, where R$^7$ is a perfluoroalkyl radical of 1 to 6 carbon atoms, and R and R$^2$ are each methyl. The process provides diorganopolysiloxane homo- and copolymer oils, fluids or gums of from 50 to 200,000,000 centipoise viscosity at 25° C. depending on whether or not, for example, a conventional chain-stopper is employed.

Among the more valuable products provided by the invention are diorganopolysiloxane copolymer oils having a viscosity of from 50 to 20,000 centipoise; fluids having a viscosity of from 50,000 to 200,000; and gums having a viscosity of from 50,000 to 100,000,000, which oils, fluids and gums have copolymer units as defined for (i) and (ii) above in which the amount of (i) ranges from 30 to 85 mol % of (i) and (ii).

DETAILED DESCRIPTION OF THE INVENTION

The R, R$^1$ and R$^2$ substituents in cyclic siloxanes (i) and cyclic siloxanes (ii) above, are representative of monovalent hydrocarbon radicals and halogenated monovalent hydrocarbon radicals that are well known as attachments to silicon atoms. However, preferably the R$^1$ substituent contains 3 carbon atoms, or more. In the formulae above, R$^1$ is the same as R or is methyl, ethyl, vinyl or phenyl. More preferably, R$^1$ is alkyl, such as propyl, butyl or hexyl, and the like, of 3 to 8 carbon atoms; halogenated alkyl, such as 3-chloropropyl, 4-chlorobutyl, 3-fluoropropyl, 3,3-difluoropropyl, 3,3,3-trifluoropropyl, and the like of 3 to 8 carbon atoms, and cycloalkyl such as cyclopentyl, cyclohexyl, cycloheptyl, and the like of 3 to 8 carbon atoms. Preferably, the R$^1$ is a substituted alkyl group such as, —CH$_2$CH$_2$R$^7$, wherein R$^7$ radical is perfluoroalkyl containing from 1 to 6 carbon atoms, such as perfluoromethyl, perfluoroethyl, perfluorohexyl, and the like. Most preferably, the R$^1$ is 3,3,3-trifluoropropyl, R is methyl or ethyl, and R$^2$ is methyl or ethyl, the latter two especially preferably being methyl.

The catalyst used in this invention is a low molecular weight ethylene oxide polymer cation complex. Essential ingredients are an alkali metal hydroxide, preferably potassium or sodium hydroxide, and a low molecular weight ethylene oxide polymer, preferably in a weight ratio of polymer to alkali metal hydroxide in the range of from about 5 to 1 to about 20 to 1, more preferably from about 6 to 1 to 15 to 1, and still more preferably from about 7.5 to 1 to about 11 to 1. The alkali metal hydroxide can alternatively be used in the form of a silanolate in the polymer complex. Silanolates are well known in this art, but preferably, the silanolate will include units of the formula, $$R_2^4\ SiO$$

wherein R$^4$ is alkyl of from 1 to 8 carbon atoms, cycloalkyl of from 4 to 8 carbon atoms or phenyl, preferably, methyl. The alkali metal hydroxide can be converted to the silanolate by mixing with a linear or cyclic polysiloxane, e.g., octamethylcyclotetrasiloxane. The ethylene oxide polymers are well known. They are believed to complex with the alkali metal hydroxide to form a cation-complex of the ion dipole type through the coordination of the cation by the oxygen atoms. The use of tetraglyme to ameliorate the rate of styrene polymerization through ion pair solvation has been described by M. Szwarc et al, J. Am. Chem. Soc. 20, 2175 (1968).

The alkali metal hydroxide cationed complex with the ethylene oxide polymer is a complex with the positive alkali metal ion and the ethylene oxide moieties such that the ethylene oxide moieties from a crown around the alkali metal ion. If the complex was examined under an electron microscope the negatively charged oxygen atoms of the ethylene oxide polymer would appear as the apices of a crown with the ethylene oxide moieties surrounding the alkali metal ion.

The above is also true of the cation complex formed by the alkali metal silanolate and the ethylene oxide polymer. In the case where the alkali metal ion is potassium, the potassium silanolate may have the formula,

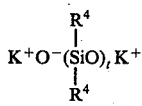

where $R^4$ is as previously defined and $t$ is 3 or 4 or a multiple of 3 or 4 depending on whether the potassium was reacted with trimer or tetramer. It should be noted that if a hexamer or pentamer is used to form the silanolate, then it would charge correspondingly. Accordingly, the positive potassium ion of the silanolate forms the center of a crown formed by the ethylene oxide moieties where the negatively changed oxygen atoms of the ethylene oxide moieties form the apices of the crown.

In general, any polymer of ethylene oxide capable of forming such a complex can be used in the presence of this invention. Such polymers are also referred to as polyethylene gylcols. Low molecular weight polymers of ethylene oxide having a molecular weight sufficient to form an ion dipole type complex but not so great that the melting point of the polymer exceeds the processing temperatures employed in the process of this invention are preferred. More preferred are polymers of the general formula,

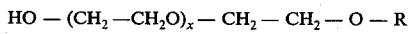

wherein R is hydrogen or methyl and $x$ is an integer of from 8 to 30, and more preferably from 8 to 24.

Low molecular weight polymers of ethylene oxide which have been found particularly useful have ranged in molecular weight from about 285 to about 1100. When added to the reactant mass with the catalytic amount of alkali metal hydroxide the low molecular weight polymers of ethylene oxide is present in the reaction mass in an amount sufficient to form the cation-complex of the ion dipole type but not so much as to cause the refractive index of the resultant polymer to change by a detectable amount. Presence of the low molecular polymer of ethylene oxide in the amount of from about 0.01 to about 0.1 percent by weight of the reaction mass is preferred, from about 0.01 to about 0.05 more preferred, and from about 0.02 to about 0.03 still more preferred. The complex of alkali metal hydroxide and low molecular weight polymer of ethylene oxide forms readily upon bringing the reactants together, even in the absence of a solvent. In one preferred way of proceeding, alkali metal hydroxide is collioded in octamethylcyclotetrasiloxane to form the alkali metal silanolate which is then converted into the complex catalyst by addition of the polyethylene glycol. It is desired to colloid the alkali metal hydroxide in the tetramer first and then add the polyethylene glycol so as to ease the dispersing of the catalyst in the polymer to be catalyzed.

It should be noted that to form the silanolate both the glycol and the alkali metal hydroxide may be added to the tetramer or trimer at the same time. An alkali metal silanolate complex will be formed from the alkali metal complex if the mixture is heated above room temperature or allowed to stand for an appreciable amount of time. To form the alkali metal silanolate the alkali metal hydroxide is mixed with the cyclic polysiloxane and allowed to stand at room temperature or heated up to about 40° C. for 1 to 15 minutes. The polyethylene glycol can then be added subsequent to the heating of the alkali metal silanolate to form the complex. If a silanolate is not desired then the glycol and alkali metal hydroxide are simply mixed without the cyclic polysiloxane and allowed to form the complex at room temperature or by heating the ingredients at a temperature of up to 40° C.

Preferably, starting materials (i) and (ii) will be obtained from diroganohalogensilanes of the formula $R^1RSiX_2$ and $R^2SiX$ wherein, R, $R^1$ and $R^2$ are as previously defined, and X is halogen, such as chlorine or bromine, and preferably, chlorine. Such diorganodichlorosilane, at a purity of at least 99% by weight are added to water at room temperature, e.g., 20°–25° C. to provide from 2 to 10 moles of water per mole of the diorganodihalosilane. In the most preferred case, after the diorganodihalosilanes have been added to the water mixture it will contain 20% by weight of HCl. Optionally, hydrolysis may be carried out in the presence of a water-immiscible solvent such as, for example, toluene, xylene, benzene, and the like. The use of a solvent facilitates the separation of the hydrolyzate from the aqueous acid solution. Preferably, a water-immiscible organic solvent is added to the water prior to the addition of the diorganodihalosilanes. The organohalosilanes, preferably at 99+% purity, are added to the water and water-immiscible solvent during ½ hour to 2 hours, with agitation. The hydrolyzate dissolves in the solvent phase, and this is then separated from the water phase. The hydrolyzate and organic solvents are then neutralized with a mild base, such as sodium bicarbonate, to a pH of about 7 to 8. The hydrolyzate product contains mostly cyclic polysiloxanes of from 3 silicon atoms to 10 silicon atoms and low molecular weight linear silanol end-stopped diorganopolysiloxanes. Heating the hydrolyzate at elevated temperature then is used to remove the solvent by overhead distillation. The hydrolyzate is then cracked by a procedure comprising adding from 0.1 to 5% by weight and preferably, from 0.1 to 2% by weight of a cracking catalyst selected from the class consisting of potassium hydroxide, and cesium hydroxide, and heating. Preferably, the amount of catalyst that is utilized is from 0.5 to 2% by weight.

Preferably, heating temperatures of above 150° C. and between 150° to 200° C. will be used and preferably, heating will be carried out under a vacuum of 1 to 100 millimeters of mercury and more preferably, under a vacuum of 5 to 40 milimeters of mercury for from 1 to 5 hours. There will be continually distilled overhead a mixture of cyclic polysiloxanes and, specifically, cyclic tripolysiloxanes, cyclic tetrapolysiloxanes, cyclic pentapolysiloxanes and cyclic hexapolysiloxanes. The cracking procedure is utilized to maximize the formation of these three types of cyclics from the broad range in the hydrolyzate. It permits conversion of 95% by weight of the hydrolyzate cyclic trisiloxanes, cyclic tetrasiloxanes and cyclic pentasiloxanes and predominantly, cyclic tetrapolysiloxanes.

The cyclic siloxanes may be separated by known distillation procedures from the other cyclics. For example, distillation can be carried out at temperatures of 80° to 200° C. and under pressures of from 1 to 100 millimeters of mercury and, more preferably, at from 1 to 20 millimeters of mercury. Such distillation procedures will readily lead to essentially pure cyclic tetrasiloxane of Formula (i) above, and the cyclic trisiloxanes and the cyclic pentasiloxanes can be recycled back into the cracking vessel and mixed with additional hydrolyzate to again produce by the cracking procedure described previously, a mixture of cyclic trisiloxanes, cyclic tetrasiloxanes and cyclic pentasiloxanes in 95% yield. Essentially pure cyclic tetrasiloxane of Formula (i), obtained in 70 to 80% yield from the siloxane hydrolyzate, contains less than 200 parts per million of monofunctional siloxy units, and less than 20 parts per million of trifunctional siloxy units. More than the above-indicated amount of monofunctional siloxy units or trifunctional siloxy units, should not be present so as to avoid gelling during the subsequent equilibration according to this invention.

The component (ii), if used as co-monomer, can also be obtained by hydrolysis and cracking, as described above. The impurity levels should be held to the limits stated to completely avoid problems with gelling.

It is also preferred that there be present less than 10 parts per million of water in the composition of cyclic siloxanes (i) and cyclic siloxanes (ii), if used, which is to be utilized with the catalyst to make polymers. Removal of all but traces of water is accomplished by heating to 100° C. or above, with a nitrogen purge. This effectively reduces the water content of the cyclic siloxane composition to less than 10 parts per million. It has been found that if there is substantially more than this amount of water present in the cyclic siloxanes, then the desired low molecular weight oil or high molecular weight diorganopolysiloxane homo- or copolymer gum will not be formed in commercially attractive yields.

To prepare the homo- or copolymers, the cyclic polysiloxanes, (i) and (ii) above, are placed in a vessel. The amount of catalyst and the reaction temperature are important. Specifically, there will be generally used 5 to 500 parts per million and, preferably, 5 to 50 parts per million, and most preferably, 10–50 parts per million (as alkali metal hydroxide) of catalyst. Preferably, the polymerization will be carried out at a temperature of from 20° to 160° C. and more preferably, at a temperature of 90° to 150° C. Especially, preferably, the temperature will be from 110° to 130° C., and specifically 120° C. If a temperature below 20° or above 160° C. is used, then the maximum yield of diorganopolysiloxane homo- or copolymer is not achieved and below 20°, the polymerization rate is somewhat too slow.

The cyclic siloxane composition of Formulae (i) and (ii) above, and the catalyst are heated or cooled to the indicated temperature range for from ½ hour to 20 hours, preferably, 50 minutes to 12 hours, during which time equilibrium is reached. At this point, 70 to 88% by weight or more of the cyclic siloxanes will have been converted to the desired diorganopolysiloxane homo- or copolymer oil or gum. In this case, there will be 12 to 30% of the cyclic polysiloxanes of formula (i) and (ii) in the equilibrated mixture. At this point, the reaction mixture is cooled, e.g., to 0° to 25° C., and there is added the agent to neutralize the catalyst. A number of conventional neutralizing agents may be used but preferably, there will be used either phosphoric acid, an organohalosilane or halosilane of the formula $R_b^6 SiX_{4-b}$, wherein $R^6$ is alkyl, cycloalkyl, vinyl or phenyl, the alkyl and cycloalkyl groups having from 1 to 8 carbon atoms, and X is bromine or chlorine and is, e.g., trimethylchlorosilane, dimethyldichlorosilane from 0 to 3.

After neutralization, the reaction mixture is heated at elevated temperatures, e.g., 150° to 200° C. under a vacuum of 1 to 100 millimeters of mercury. This strips off all cyclic polysiloxanes, and these may be recycled into the equilibration vessel. There remains a diorganopolysiloxane homo- or copolymer oil or gum.

In accordance with known techniques, the viscosity of the copolymer can be controlled by adding a chain-stopper to the composition of co-monomers (i) and (ii) and catalyst. Such chain-stoppers can be, for example, disiloxanes or low molecular weight diorganopolysiloxanes having triorganosiloxy terminal units, that is, having monofunctional terminated units. The organo substituents in such chain-stoppers are typically alkyl of 1 to 8 carbon atoms, vinyl, phenyl or cycloalkyl of 4 to 8 carbon atoms, such as trifluoropropoyl.

Typically, the preferred chain-stopper will be of the formula,

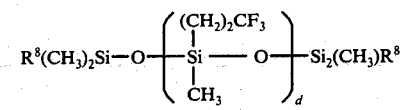

wherein $R^8$ is —CH$_3$ or —CH=CH$_2$ and $d$ is 3 to 7. As will be obvious, the amount of chain-stopper that is used in the equilibration mixture will be selected to produce the desired final molecular weight or viscosity of the diorganopolysiloxane copolymer oil or gum. Illustratively, higher amounts, e.g., 30 ml. of chain-stopper per 100 ml. of mixed cyclics will produce the lowest molecular weight oils, e.g., 50 centipoise at 25° C. Smaller amounts, e.g., 0.01 ml. of chain-stopper per 100 ml. of mixed cyclics will produce higher molecular weights, e.g., 100,000 centipoise at 25° C. The highest molecular weight will be obtained without chain-stopper.

The process of this invention produces linear diorganopolysiloxane homo- or copolymer oils or gums in which each silicon atom in the respective units has an R and $R^1$ or $R^2$ substituent group. The copolymer oil or gum will have a viscosity of between 50 and 200,000,000 centipoise at 25° C. Obviously, the homo- and copolymer oils and gums can be formulated, e.g., by mixing with reinforcing fillers, such as fumed silica or precipitated silica; extending fillers, such as zinc oxide, titanium oxide, diatomaceous earth, and the like; heat aging additives, such as iron oxide; pigments, and other additives, such as flame retardant for instance, platinum, by itself, or in combination with other materials and self-bonding additives, such as for instance, triallylisocyanurate. The homo- and copolymer gums can be mixed into a uniform mass to which is added a curing agent, e.g., a peroxide curing agent, such as benzoyl peroxide or dicumyl peroxide. The resulting composition can be cured at elevated temperatures, e.g., from 100° to 300° C., or they can be cured by radiation to produce a homo- or copolymer silicone elastomer. The low viscosity oils can be used as such or used to formulate greases, etc.

DESCRIPTION OF THE PREFERRED EMBODIMENTS

The following examples are for the Purpose of illustrating the present invention. All parts are by weight. They are not to be construed to limit the invention in any manner whatsoever.

EXAMPLE 1

There is taken a resin flask and there is placed in it 100 parts of octamethylcyclotetrasiloxane and the contents are purged with dry nitrogen for 30 minutes to reduce the water content to below 10 parts per million. An aliquot of such octamethylcyclotetrasiloxane is taken and to the aliquot there is added KOH and a low molecular weight polymer of ethylene oxide in which the KOH and ethylene oxide are colloided in the tetrasiloxane in an Eppenback colloidal mill. The low molecular weight polymer of ethylene oxide which has a molecular weight of from 285 to about 315, a specific gravity of about 1.125, a melting point of about −8° to −15° C., and a flash point or abut 196° C. is added in an amount to provide by weight three times the weight of KOH. The resulting colloided mixture is heated to 40° C. for 3 to 5 minutes to form the potassium silanolate ethylene oxide complex. The complex that is formed comprises a potassium silanolate of the formula,

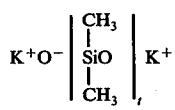

where $t$ is 4 or a multiple of 4 and where if examined under an electron microscope the potassium ion of the silanolate would be in the center surrounded by a crown of ehtylene oxide moieties where the negatively charged oxygen atoms of the ethylene oxide moieties would be the apices of the crown. The potassium silanolate complex may be extracted with methanol from the colloided mixture and then precipitated as a crystalline mass by evaporation of the methanol so it can be examined by an electron microscope.

It should be noted that the polyethylene oxide and KOH were colloidalized in the aliquot of the tetrasiloxanes to form the potassium silanolate complex so as to aid in dispersing the catalyst in the main body of tetrasiloxane to be polymerized. Accordingly, the main body of the tetrasiloxane is heated to 160° C. and the complex is added to the tetrasiloxane in an amount to provide 10 ppm (as KOH). Polymerization is rapid, equilibrium being reached in 10-12 minutes. The catalyst is neutralized by adding a 1% solution of phosphoric acid in tetrahydrofuran. The mixture is heated to 155° C. under a vacuum of 1 mm Hg. Volatiles are distilled and collected. The final product is obtained in about an 88% yield and comprises a polydimethylsiloxane gum of about 100,000,000 centipoise viscosity at 25° C. This gum is suitable for use in formulating silicone elastomers.

EXAMPLE 2

The procedure of Example 1 is repeated, substituting for the polymer of ethylene oxide, used therein, a low molecular weight polymer of ethylene oxide having a molecular weight of from about 380 to about 420, a specific gravity of about 1.1281, a melting point of about 4 to 8° C., and a flash point of about 224° C. The reaction with colloided KOH is at room temperature. Substantially the same results are obtained.

EXAMPLE 3

The procedure of Example 1 is repeated, substituting for the polymer of ethylene oxide, used therein, a low molecular weight polymer of ethylene oxide having a molecular weight of from about 570 to about 630, a specific gravity of about 1.1279, a melting point of about 20° to 25° C., and a flash point of about 255° C. Substantially the same results are obtained.

EXAMPLE 4

The procedure of Example 1 is repeated, substituting for the polymer of ehtylene oxide, used therein, a low molecular weight polymer of ethylene oxide having a molecular weight of from about 950 to 1050, a specific gravity of about 1.01, a melting point of about 37° to 40° C., and a flash point of about 266° C. Substantially the same results are obtained.

EXAMPLES 5 THROUGH 8

The procedures of Examples 1 through 4 are each, in turn, repeated substituting in each procedure an equivalent molar amount of NaOH for the KOH used therein. In each procedure substantially the same results are obtained.

EXAMPLE 9

The procedure of Example 1 is repeated, substituting for the octamethylcyclotetrasiloxane the compound 1,3,5,7-tetramethyl-tetrakis-1,3,5,7-(3,3,3-trifluoropropyl)cyclotetrasiloxane. There is obtained, as the final product, a methyl,-3,3,3-trifluoropropylpolysiloxane homopolymer gum, which is suitable for formulation into oil resistant silicone rubber compositions.

EXAMPLE 10

The procedure of Example 9 is repeated, but there is included in the reaction mixture 4 ml. of the chain-stopper compound: dimethyl-vinyl terminated methyl-3,3,3-trifluoropropylpolysiloxane averaging 5 siloxane units. The final product is dimethylvinyl terminated methyl-3,3,3-trifluoropropylpolysiloxane homopolymer oil, suitable for use as a plasticizer or a de-foamer.

EXAMPLE 11

In a suitable flask of appropriate size and placed about 100 parts by weight of cyclic fluorosilicone trimer having the formula,

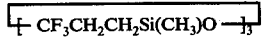

about 25 parts by weight of hexamethylcyclotrisiloxane having the formula,

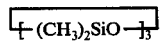

and about 0.001 parts by weight of vinyl-terminated fluorosilicone tetramer having the formula,

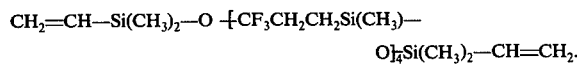

The contents of the flask are heated to about 120° C. whereupon about 0.0025 parts by weight of sodium hydroxide as a sodium silanolate ethylene oxide complex formed by the same procedure as Example 1, colloided in sufficient dimethylsiloxane tetramer to give a mixture of about 2.46 weight percent of NaOH, and about 0.06 parts by weight of a low molecular weight polymer of ethylene oxide (polyethylene glycol) having a molecular weight ranging from about 285 to about 315 and sold under the designation carbowax ® 300 are added. The contents appear to react almost immediately. The flask is maintained at a temperature of about 120° C. for about 4½ hours. The residual sodium hydroxide catalyst is then neutralized by adding about 0.0008 parts by weight of trimethylchlorosiloxane. Subsequently, volatiles are stripped down to about 2.3% by weight and about 82 parts by weight of polymer are recovered. The viscosity of the recovered polymer is found to range from about 275,000 centipoise to about 320,000 centipoise. This polymer is suitable for use in formulating silicon elastomers.

EXAMPLE 12

The procedure of Example 11 is substantially repeated except that in place of Carbowax ® 300, about 0.07 parts by weight of Carbowax ® 400, a polyethylene glycol having a molecular weight range of from about 380 to about 420, a specific gravity of about 1.1281, a melting point of about 4°–8° C., and a flash point of about 224° C., is used. Subsequent to polymerization and upon being devolatilized down to 3.6 percent by weight volatiles, a polymer having a viscosity of about 185,000 centipoise is recovered. This polymer is also suitable for use in formulating silicone elastomers.

EXAMPLE 13

The procedure of Example 11 is substantially repeated except that in place of Carbowax ® 300, about 0.07 parts by weight of Carbowax ® 600, a polyethylene glycol having a molecular weight range of from about 570 to 630, a specific gravity of about 1.1279, a melting point of about 20°–25° C., and a flash point of about 246° C., is used. Subsequent to polymerization a polymer having a viscosity of about 262,500 centipoise is recovered. This polymer is also suitable for use in formulating silicone elastomers.

EXAMPLE 14

The procedure of Example 11 is substantially repeated except that in place of Carbowax ® 300, about 0.07 parts by weight of Carbowax ® 1000, a polyethylene glycol having a molecular weight range of from about 950 to 1050, a specific gravity of about 1.01, a melting point of about 37°–40° C., and a flash point of aout 366° C., is used. Subsequent to polymerization a polymer having a viscosity of about 50,500 centipoise is recovered. This polymer is suitable for use as a silicone fluid.

EXAMPLE 15

The procedure of Example 13 is substantially repeated but the amount of vinyl-terminated fluorosilicone tetramer is increased to about 0.0015 parts by weight. Subsequent to polymerization and upon devolatilization to about 2.4 percent volatiles, a polymer having a viscosity of about 114,000 centipoise is recovered.

EXAMPLE 16

The procedure of Example 12 is substantially repeated but the amount of vinyl-terminated fluorosilicone tetramer is increased to about 0.002 parts by weight. Subsequent to polymerization and upon devolatilization to about 1.8 percent by weight volatiles, a polymer having a viscosity of about 38,000 centipoise is recovered.

EXAMPLE 17

The procedure of Example 12 is substantially repeated with the vinyl-terminated fluorosilicone tetramer being replaced about 0.002 parts by weight of methyl vinyl siloxane trimer having a formula of,

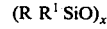

and a methyl terminated dimethylpolysiloxane having a formula of $(CH_3)_3Si-O-[Si(CH_3)_2O]_{12}Si(CH_3)_3$ is added in the amount of about 0.0016 parts by weight. Subsequent to polymerization, a useful silicone polymer with a penetration of about 231 is recovered.

EXAMPLE 18

The procedure of Example 17 is substantially repeated with Carbowax ® 600 used in place of Carbowax ® 400. Subsequent to polymerization, a useful silicone polymer with a penetration of about 213 is recovered.

In similar fashion these and other silicone polymers can be prepared by the use of alkali metal hydroxides in the form of silanolates such as, sodium fluorosilanolate, disodium fluoropropylalkylsilanolate, sodium fluoropropylmethylsilanolate and potassium analogues thereof.

EXAMPLES 19–26

The procedures of Examples 11 through 18 are substantially repeated with the sodium catalyst being replaced by an equivalent amount of potassium catalyst. In each instance useful silicone polymers are recovered.

Each of the products prepared in Examples 15–26 are suitable for use in formulating silicone elastomers.

I claim:

1. A process for producing a diorganopolysiloxane having a viscosity of from 50 to 200,000,000 centipoise at 25° C., comprising (A) reacting a compositon comprising (i) a cyclic polysiloxane of the formula, $(R R^1 SiO)_x$ or a mixed such plysiloxane wherein R is selected from the class consisting of methyl, ethyl, vinyl or phenyl and $R^1$ is selected from the class consisting of alkyl radicals of 3 to 8 carbon atoms, halogenated alkyl radicals of 3 to 8 carbon atoms and cycloalkyl radicals of 3 to 8 carbon atoms and x is from 3 to 6, and (ii) a cyclic polysiloxane of the formula, $(R_2^2 SiO)_y$ wherein $R^2$ is, independently, selected from the class consisting of methyl, ethyl, vinyl or phenyl and y is from 3 to 6 or a mixed such polysiloxane, (i) being present in an amount of from 30 to 100 mol % of the composition, at a temperature in the range of 20° C. to 160° C. in the presence of 5 to 500 parts per million, as alkali metal hydroxide, of a catalyst comprising (a) alkali metal hydroxide complexed with a low molecular weight polymer of ethylene oxide, or (b) a silanolate of alkali metal hydroxide complexed with a low molecular weight polymer of ethylene oxide, and (B) neutralizing the catalyst in the reaction mixture after equilibrium has been reached.

2. A process as defined in claim 1, wherein the low molecular weight polymer of ethylene oxide is of the general formula,

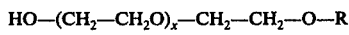
HO—(CH$_2$—CH$_2$O)$_x$—CH$_2$—CH$_2$—O—R wherein R is hydrogen or methyl and $x$ is an integer of from 8 to 30.

3. A process as defined in claim 1 wherein the silanolate includes units of the formula R$_2^4$ SiO wherein the R$^4$ groups, independently, are alkyl of from 1 to 8 carbon atoms, cycloalkyl of from 4 to 8 carbon atoms or phenyl.

4. A process as defined in claim 3 wherein R$^4$ is methyl.

5. A process as defined in claim 1, wherein the catalyst is neutralized with phosphoric acid, a compound of the formula, R$_b^6$ SiX$_{4-b}$, where R$^6$ is alkyl, cycloalkyl, vinyl or phenyl, X is bromine or chlorine, and $b$ is from 0 to 3, or a hydrolyzed tris(haloalkyl)phosphite.

6. A process as defined in claim 1, wherein the alkali metal hydroxide is sodium hydroxide or potassium hydroxide.

7. A process as defined in claim 1, wherein the cyclic polysiloxanes are reacted with the catalyst for from ½ hour to 20 hours.

8. A process as defined in claim 1, wherein the cyclic polysiloxanes and mixtures thereof contain less than 20 parts per million of trifunctional siloxanes, less than 200 parts per million of monofunctional siloxanes, and less than 10 parts per million of water.

9. A process as defined in claim 1, wherein R$^1$ is R$^7$CH$_2$CH$_2$—and R$^7$ is perfluoroalkyl of 1 to 6 carbon atoms.

10. A process as defined in claim 1, wherein R$^1$ is CF$_3$CH$_2$CH$_2$—; R and R$^2$ are each methyl; and $x$ and $y$ are 3 or 4.

11. A process as defined in claim 10, wherein $x$ is 4 and $y$ is 3 or 4.

12. A process as defined in claim 1, wherein component (i) comprises 100 mol % of the composition.

13. A process as defined in claim 1, wherein cyclic polysiloxane (i) is present in an amount of from 30 to 96 mol % of the composition.

14. A process as defined in claim 1, wherein cyclic polysiloxane (i) is present in an amount of from 30 to 85 mol % of the composition.

15. A process as defined in claim 1, wherein step (A) is carried out at a temperature in the range of 90° C. to 150° C.

* * * * *

UNITED STATES PATENT AND TRADEMARK OFFICE
CERTIFICATE OF CORRECTION

PATENT NO. : 4,122,247

DATED : October 24, 1978

INVENTOR(S) : Edwin Robert Evans

It is certified that error appears in the above—identified patent and that said Letters Patent is hereby corrected as shown below:

In Claim 1, Col. 12, at line 63, insert an open parenthesis "(" before the formula so it appears as follows:

$$-- (R_2^2 SiO)_y --.$$

Signed and Sealed this

Eighth Day of February 1983

[SEAL]

Attest:

Attesting Officer

GERALD J. MOSSINGHOFF

Commissioner of Patents and Trademarks